United States Patent
Almström

[11] Patent Number: 6,097,516
[45] Date of Patent: Aug. 1, 2000

[54] OPTICAL ADD DROP MULTIPLEX (OADM)

[75] Inventor: Erland Almström, Solna, Sweden

[73] Assignee: Telefonaktiebolaget LM Ericsson, Stockholm, Sweden

[21] Appl. No.: 08/849,693

[22] PCT Filed: Dec. 11, 1995

[86] PCT No.: PCT/SE95/01490

§ 371 Date: Jun. 11, 1997

§ 102(e) Date: Jun. 11, 1997

[87] PCT Pub. No.: WO96/19884

PCT Pub. Date: Jun. 27, 1996

[30] Foreign Application Priority Data

Dec. 21, 1994 [SE] Sweden ................................. 9404446

[51] Int. Cl.[7] .......................... H04B 10/20; H04B 10/08; H04J 14/02

[52] U.S. Cl. ......................... 359/119; 359/119; 359/110; 359/128

[58] Field of Search ................... 359/128, 119, 359/123, 161; 370/222, 223

[56] References Cited

U.S. PATENT DOCUMENTS

| | | | |
|---|---|---|---|
| 3,652,798 | 3/1972 | McNeilly et al. | 179/15 |
| 4,190,821 | 2/1980 | Woodward | 340/147 |
| 4,704,713 | 11/1987 | Haller et al. | 370/3 |
| 4,797,879 | 1/1989 | Habbab et al. | 370/3 |
| 4,829,512 | 5/1989 | Nakai et al. | 371/16 |
| 4,979,879 | 12/1990 | Da Costa | 417/312 |
| 5,003,531 | 3/1991 | Farinholt et al. | 370/16.1 |
| 5,185,736 | 2/1993 | Tyrrell et al. | 370/55 |
| 5,208,692 | 5/1993 | McMahon | 359/128 |
| 5,229,875 | 7/1993 | Glista | 359/110 |
| 5,278,824 | 1/1994 | Kremer | 370/15 |
| 5,335,104 | 8/1994 | Johnson | 359/110 |
| 5,442,623 | 8/1995 | Wu | 370/16.1 |
| 5,450,224 | 9/1995 | Johansson | 359/128 |
| 5,680,235 | 10/1997 | Johansson | 359/110 |
| 5,710,777 | 1/1998 | Gawne | 371/20.6 |

FOREIGN PATENT DOCUMENTS

| | | |
|---|---|---|
| 651 528 | 5/1995 | European Pat. Off. . |
| 651 529 | 5/1995 | European Pat. Off. . |

*Primary Examiner*—Jason Chan
*Assistant Examiner*—Mohammad Sedighian
*Attorney, Agent, or Firm*—Burns, Doane, Swecker & Mathis, L.L.P.

[57] ABSTRACT

A method of configuring subnodes, or configuring a system of subnodes, in an optical network ring against both node and fiber failure using an OADM, Optical Add Drop Multiplexer. The network includes a working ring and a stand-by ring and each subnode includes a selective optical filter, an optical 2×2 switch and an optical amplifier. The method and the system further include steps of monitoring the inputs and outputs of each subnode at the working and stand-by rings using monitor devices which generate alarm signals upon detection of signal loss at a subnode. As a response to the alarm signal, the state of the subnode, that causes the alarm signal is transferred from a first state into one of a number of possible new states as a function of the generated alarm signal, thereby selecting a switch configuration for the subnode according to the new state to clear the error detected.

10 Claims, 5 Drawing Sheets

| Node state | Switch configuration | Monitor signals |
|---|---|---|
| S1 | 1 - 3 | $M_1$ signal |
|  | 2 - 4 | $M_2$ signal |
| S2 | 1 - 3 | $M_1$ loss of signal |
|  | 2 - 4 | $M_2$ signal |
| S3 | 1 - 4 | $M_1$ signal $M_2$ loss of signal |
| S4 | 2 - 3 | $M_1$ loss of signal $M_2$ signal |

FIG. 3

OPTICAL ADD DROP MULTIPLEX (OADM)

TECHNICAL FIELD

The present invention relates to a method or a system for a Self-Healing Node architecture in a fiber ring network, and more particularly to an optical add drop multiplexer (OADM).

BACKGROUND

A fiber ring network is a collection of nodes forming a closed loop, where each node is connected via a duplex communications facility. The multiplexing devices used in the SDH/SONET ring architecture are Add Drop Multiplexers (ADM) that add and drop local channels and pass through transit channels. A Self-Healing Ring is a ring network that provides redundant bandwidth so that disrupted services can automatically be restored following network failures.

Present technology, as disclosed in U.S. Pat. No. 5,185,736 to Tyrrel et al. can only provide protection against fiber failure, not node failure. In U.S. Pat. No. 4,704,713 to Haller et al. is shown a method for dealing with the node failure, but no fiber failure. Additionally, this solution is not transparent to services, bit rate and code format, due to the electro-optical conversion in every second node.

Wavelength Division Multiplexing has so far been focusing on packet switched networks as disclosed in U.S. Pat. No. 4,979,879 to Habbab et al.; U.S. Pat. No. 4,797,879 to Eda; U.S. Pat. No. 5,208,692 to McMahon. All of these solutions are for Local Area Networks (LAN), and are not competitors to SDH/SONET systems.

A SDH/SONET ring is costly to upgrade. If changes are made in one subnode, e.g., increasing the bit rate, changes have to be made in all the other subnodes around the ring as well. However, with the introduction of a multi-wavelength based network layer the flexibility can be extended even more. New transmission formats can be introduced on different wavelengths and in the same fiber network, e.g., a physical ring.

When the total traffic flow concentrates in the same fiber, the demand for protection of the ring increases. A desirable protection feature is a simple, fast and efficient handling whenever a fault occurs.

SUMMARY

According to a first object of the present invention is disclosed a method of configuring subnodes, or configuring a system of subnodes, in an optical network ring against both node and fiber failure, which network comprises a working ring and a stand-by ring and each subnode includes monitor points, selective optical filter means, optical 2×2 switch means and optical amplifier means, and further comprising the steps of monitoring the inputs and outputs of each subnode for the working and stand-by rings by means of monitor device means monitoring the monitor points; generating by means of the monitor device means an alarm signal upon detection of signal loss at a subnode; setting as a response to the alarm signal the state of the subnode causing the alarm signal from a first state into one of a number of possible conditions as a function of the generated alarm signal; and selecting a switch configuration for the subnode according to the new state.

Further objects and steps of the method and the system according to the present invention are set forth in the dependent claims.

BRIEF DESCRIPTION OF THE DRAWINGS

The invention, together with further objects and advantages thereof, may best be understood by making a reference to the following detailed description taken together with the accompanying drawings, in which:

FIG. 3 is a table representation of node state, switch configuration and monitor signals corresponding to the OADM of FIG. 2;

DETAILED DESCRIPTION

Figure 1:
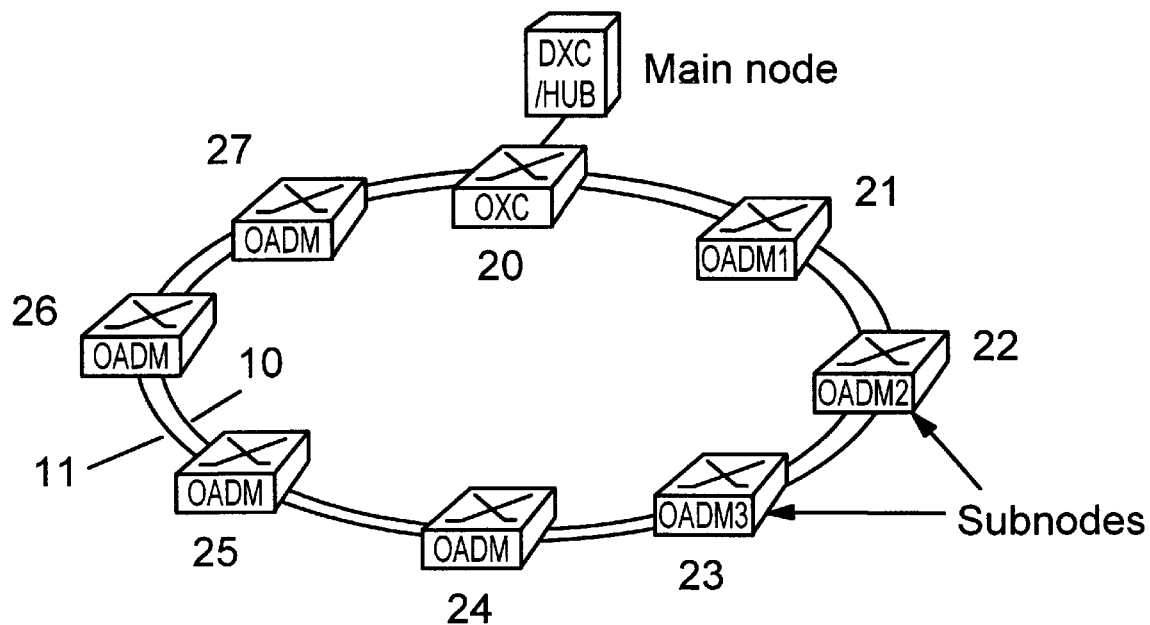
FIG. 1 is a simple block diagram illustration of an optical Self-Healing Ring according to the invention.
Figure 2:
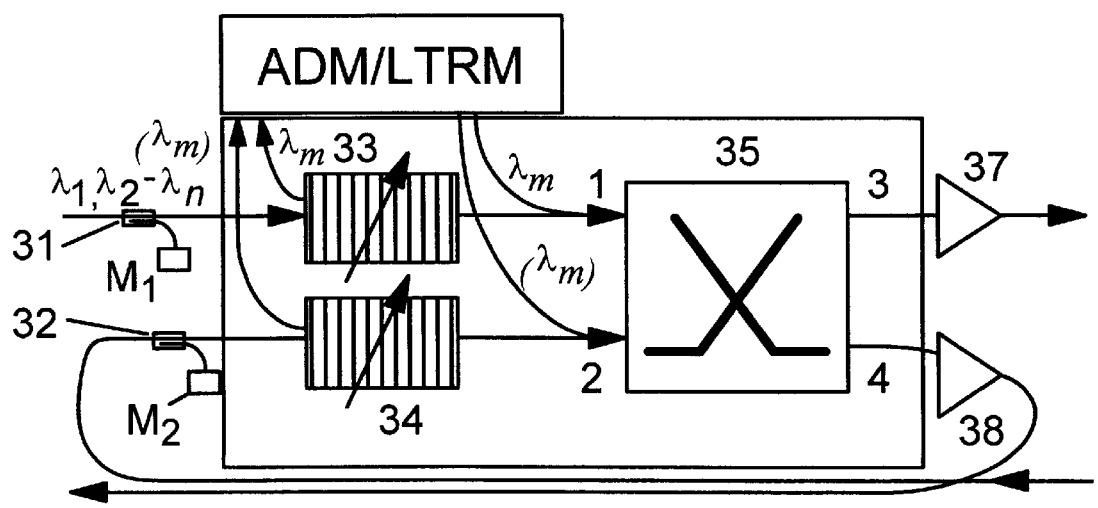
FIG. 2 is a block diagram of an Optical Add Drop Multiplexor utilized in the present invention.

FIG. 1 demonstrates a Self-Healing Ring comprising two sets of optical fibers, 10 and 11, connecting a number of subnodes 21–27 into a ring structure, which in turn is connected to a main node 20 (OXC) and to a DXC/HUB 15. Referring to FIG. 1, each subnode is designated as a number n Optical Add Drop Multiplexor (OADMn). An OADM comprises at least two monitor points 31 and 32, two selective optical filters 33 and 34, an optical 2×2 switch 35 and two optical amplifiers 37 and 38 as is illustrated in FIG. 2. Two optical passive couplers may be used to give access to both fibers if just one transmitter and one receiver are used e.g, Line TeRMinal. Additionally each subnode is according to the state of the art including its own processing facility (not shown) handling the exchange of signals to and from the network.

Each node 21–27 is capable of creating alarm signals $I_1$ and $I_2$ serving as a basis for switching decisions necessarily made after a fiber or a node break-down. A fraction of the signal is drawn off at two monitoring points 31, 32 near each node. Both the working ring 10 and the standby ring 11 are supervised by at least one such monitor point, as demonstrated in FIG. 2.

The alarm signals $I_1$ and $I_2$ are derived from monitoring means $M_1$ and $M_2$, representing simple detectors judging if there is a signal on the fiber or not, i.e. whether the specific fiber section is unbroken or not. When $M_1$ detects a signal loss on the working ring 10 it generates and sends an alarm signal $I_1$. In the same way $M_2$ creates an alarm signal $I_2$ when loss of signal occurs on the stand-by ring 11.

The nodes appear in different conditions, characterized by the way the optical switch is configured and the way the optical filter is activated, for instance, which of the inputs and outputs that have been interconnected. The four fundamental node states are:

S1 The entire system is intact and the traffic is flowing on the working ring.

S2 Line switching and the traffic is moved to the stand-by ring.

S3 Folding after the node. A fiber breakage has occurred somewhere after the node (on the fiber length between this node and the next). Outgoing signals are to be sent backwards, i.e., on the stand-by ring.

S4 Folding in front of the node. A fiber breakage has occurred somewhere between the node and the preceding one. Outgoing signals are to be forwarded on the working ring.

Under normal conditions (unbroken fibers and no malfunction of the nodes), the nodes are transmitting on the working ring 10. Yet the monitoring system requires a signal on the fiber in order to tell if it is broken or not. Therefore we may, for instance, make use of a distributive signal or the amplified spontaneous emission from the optical amplifiers. 38 in an additional way by sending it on the standby ring 11 for monitoring purposes.

FIG. 2 shows a more detailed block diagram of a subnode having optical filters 33, 34, a supervisory block as well as an optical 2×2 switch block 35 having two inputs and two outputs. The optical switch block will be controlled by the different available node states. Moreover, the table in FIG. 3 presents a list of the possible node states S1–S4 in combination with their corresponding optical switch configurations and monitor signals.

Figure 4:
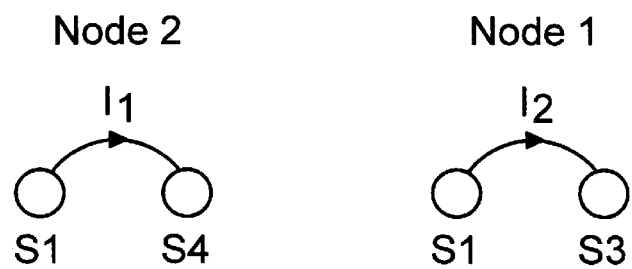
FIG. 4 demonstrates the course of events in a symbolic way when folding two nodes assigned Node 2 and Node 1.

According to the present invention it is possible to select either of two measures in case of a fiber breakage such as
  a) folding the ring, or
  b) line switching
a) Folding FIG. 1 shows a block diagram of a self-healing ring. A fiber breakage occurring on the working ring 10 between subnode 21 (OADM$_1$) and subnode 22 (OADM$_2$) brings about the following events:

M$_1$ at node 22 (OADM$_2$) detects a signal loss (no signal on the working ring 10) and sends the alarm signal I$_1$ to the switch which folds the ring in front, i.e. turns the node to state S4. With node 22 in state S4 no signal is transmitted on the stand-by ring at node 21, referring to the table in FIG. 3. This causes M$_2$ at node 21 to detect a signal loss and send the alarm I$_2$ to a processor card in node 21. As a result node 21 folds behind, i.e. turns to state S3. The other nodes detect no difference. FIG. 4 symbolically shows the course of events.

If the fiber breakage had occurred instead on the stand-by ring 11 the same events would have taken place, but in the opposite order. Also notice that for m nodes in the optical network ring subnode OADM$_m$ will be equal to OADM$_o$.

In case of a node failure the folding of the ring is accomplished in exactly the same way as for a fiber breakage. In both cases M$_1$ or M$_2$ do simply observe the loss of signal, the reason why it is lost makes no difference.

b) Line switching

Figure 5:
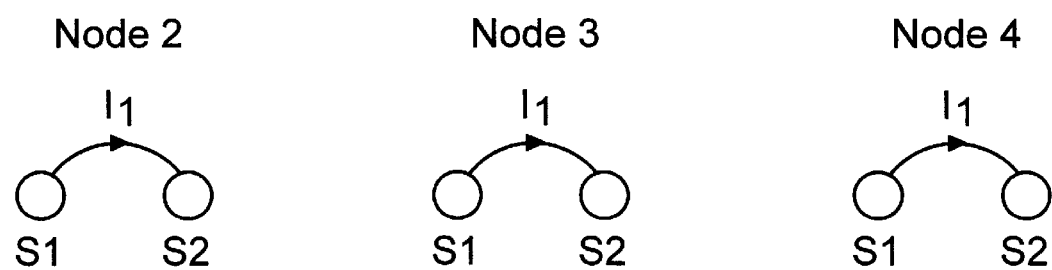
FIG. 5 demonstrates in a similar way the scheme for line switching of three nodes assigned Node 2, Node 3 and Node 4.

If line switching is the chosen alternative for a fiber breakage between subnodes 21 and 22 in FIG. 2 on the working ring 10 an alarm signal I$_1$ is brought to node 22. Node 22 reacts by activating the optical filter 34 on the stand-by ring 11, i.e turning the subnode to condition S2. Node 22 in a condition S2 gives I$_1$ to the next node 23 which also turns to a condition S2. Similarly this node in condition S2 gives I$_1$ to the next node, finally turning even this node to condition S2, and so on. A schematic description is shown in FIG. 5.

A fiber breakage taking place at some other point in the ring would cause the same events in the same sequence. A fiber breakage at the stand-by ring 11 would be detected by a node and then be reported to the management system. No further proceedings are to be taken in this case.

One node condition not discussed is the bypass function. This becomes rather important in case of a node failure when several nodes utilize the same wavelength. If one of them goes down the other one still will be able to communicate.

The optical signal should then simply be passed through the node. This is easily accomplished in the OADM by setting the optical filters in the 'pass all' state, see FIG. 2. The default value (when no voltage is supplied) should be 'pass all' for the filters 33, 34 and node state S1 for the switch, see table in FIG. 3.

Besides the advantages in connection with failures the OADM structure according to the present invention offers a greater simplicity for adding and removing nodes in an existing optical network.

An Optical Add Drop Multiplexing node in an optical network may of course be designed in numerous ways, by using different components than what has been indicated here in an illustrative embodiment, without deviating from the spirit, object and scope of the present disclosed method and system defined by the attached claims.

Flow chart diagrams

Figure 6:
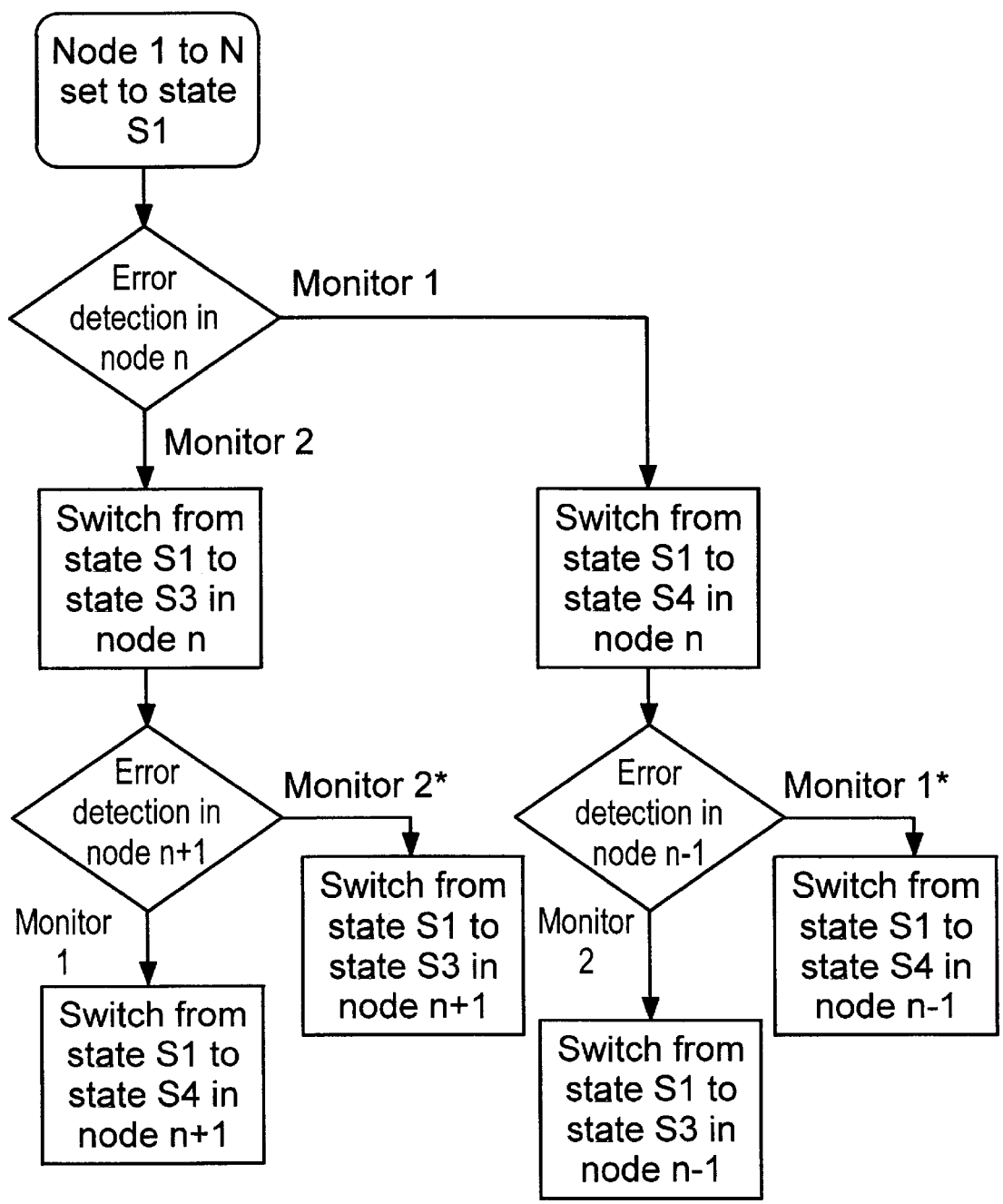
FIG. 6 is a flow chart demonstrating folding of an WDM Self-Healing Ring.

In FIG. 6 is shown a flow chart demonstrating folding of a WDM Self-Healing Ring. Initially all nodes are set in state S1 and will remain in this state until a failure occurs. If a failure occurs at node n monitor M$_1$ detects a signal loss (no signal on the working ring 10) and transmits an alarm signal I$_1$ to the switch 35 of the node. The switch folds the ring in front, i.e. turns the node n to state S4.

With node n in state S4, no signal is transmitted on the stand-by ring 11 -at node n−1. This causes an alarm signal 12 to be activated at node n−1 indicating a signal loss whereby this alarm signal I$_2$ will be transferred to a processor card in node n−1. As a result node n−1 folds behind, i.e. turns to state S3. This is indicated by the portion to the right in FIG. 6. The other nodes detect no difference.

If the fiber breakage had occurred instead on the stand-by ring 11 the same events would take place, but in the opposite order, which is indicated in the portion to the left in FIG. 6. In case of a node failure the folding of the ring is accomplished in exactly the same way as for a fiber breakage. In both cases M$_1$ or M$_2$ do simply observe the loss of signal, the reason why it is lost makes no difference.

If two errors occur in the ring on the same fiber, as noted by the monitor signals marked with an asterisk (*), then at least the affected node n will be disconnected, but the rest of the network will continue its operation. Each event is preferably reported to a management system.

Figure 7:
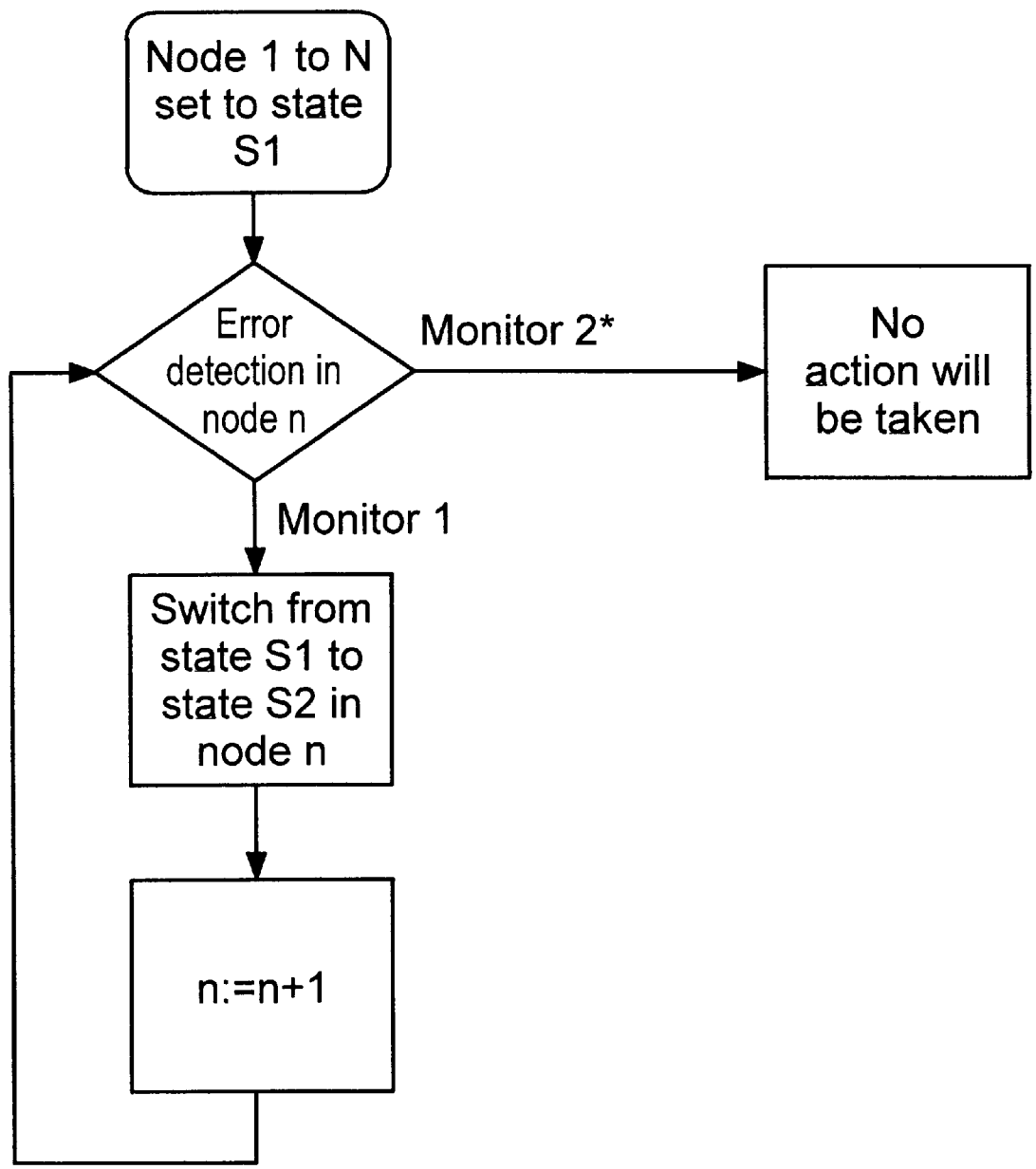
FIG. 7 is a flow chart demonstrating line switching of a WDM Self-Healing Ring.

Finally in FIG. 7 is shown a flow chart demonstrating line switching of a WDM Self-Healing Ring. Initially all nodes are set in state S1 and will remain there until a failure occurs.

If a breakage at the working ring 10 occurs, this brings I$_1$ to node n. Node n reacts by activating the filter on the stand-by ring 11, i.e. turning the node to condition S2. Node n in state S2 forwards I$_1$ to the next node n+1 that also turns to condition S2. Similarly this node in state S2 forwards I$_1$ to the next node, and so on. As a result of this all of the nodes of the network will then be using the stand-by ring 11 instead of the working ring 10, whereby necessary folding will be using the working ring 10 instead of the stand-by ring 11. If both fibers on the ring detect errors (monitor 1 and 2), indicated by the asterisk (*) at Monitor 2, the ring will be broken A fiber breakage at the stand-by ring 11 would be reported by the detecting node to the management system. No further proceedings are to be taken in this case.

What is claimed is:

1. A method of configuring subnodes in an optical network ring against both node and fiber failure, the network including a unidirectional working ring and a unidirectional stand-by ring and each subnode including monitor points, selective optical filter means, optical 2×2 switch means and optical amplifier means, the method comprising the steps of monitoring inputs and outputs, respectively, of each subnode for the working and stand-by rings by monitor device means for monitoring the monitor points, generating by the monitor device means an alarm signal upon detection of signal loss at a subnode, setting, as a response to the alarm signals a new state of the subnode causing the alarm signal, said subnode being set from a first state into one of a number of possible new states as a function of the generated alarm signal, said possible new states including folding a ring in front of or behind a subnode and line switching, and selecting a switch configuration for the subnode according to the new state.

2. The method according to claim 1, wherein there are at least four states for the subnode, the method further comprising the additional step of folding a ring in front of the subnode, as one alternative measure, when a monitor device means is generating an alarm signal, whereby the subnode is set from a first state to a fourth state and the subnode no longer will be receiving any signal on the ring at the subnode, whereby an alarm signal will be generated to a preceding subnode and the preceding subnode will be switched from a first state to a third state.

3. The method according to claim 1, wherein there are at least four states for the subnode, the method further comprising the additional step of folding a ring behind the subnode, as one alternative measure, when a monitor device means is generating an alarm signal, whereby the subnode is set from a first state to a third state and the subnode no longer will be transmitting any signal on the ring at the subnode, whereby an alarm signal will be generated at a next subnode and the next subnode will be switched from a first state to a fourth state.

4. The method according to claim 1, comprising the additional step of line switching the working ring, as another alternative measure, to a broken fiber between the subnode and the preceding subnode whereby a filter on the standby ring will be activated by turning the subnode from a first state to a second state, which in turn will turn the preceding subnode and a next subnode from a first state into a second state thereby using the standby ring as a bypass.

5. The method according to claim 1, comprising the additional step of setting a default value for each subnode to be 'pass all' for the optical filters and the node in a first node state for passing the optical signals through.

6. A system of subnodes in an optical network ring configured against both node and fiber failure, the network comprising a unidirectional working ring and a unidirectional stand-by ring and each subnode including monitor points, selective optical filter means, optical 2×2 switch means and optical amplifier means, and the system further comprising means for monitoring inputs and outputs, respectively, of each subnode for the working and stand-by rings by monitoring the monitor points, means for generating by the monitoring means an alarm signal upon detection of signal loss at a subnode, means for setting, as a response to the alarm signal, a new state of the subnode causing the alarm signal, said subnode being set from a first state into one of a number of possible new states as a function of the generated alarm signal, said possible new states including folding a ring in front of or behind a subnode and line switching, and means for selecting a switch configuration for the subnode according to the set new state.

7. The system according to claim 6, wherein there are at least four states for the subnode, and a ring is folded in front of the subnode, when a monitoring means is generating an alarm signal, whereby the subnode is set from a first state to a fourth state and the subnode no longer will be receiving any signal on the ring at the subnode, whereby an alarm signal will be generated to a preceding subnode and the preceding subnode will be switched from a first state to a third state.

8. The system according to claim 6, wherein there are at least four states for the subnode, and a ring is folded behind the subnode, when a monitor device means is generating an alarm signal, whereby the subnode is set from a first state to a third state and the subnode no longer will be transmitting any signal on the ring at the subnode, whereby an alarm signal will be generated at a next subnode and the next subnode will be switched from a first state to a fourth state.

9. The method according to claim 6, wherein the working ring is switched to a broken fiber between the subnode and the preceding subnode whereby the filter means on the standby ring will be activated by turning the subnode from a first state to a second state, which in turn will turn the preceding subnode and a next subnode from a first state into a second state thereby using the stand-by ring as a bypass.

10. The system according to claim 6, wherein a default value is set as 'pass all' for each subnode optical filter means and the node in a first node state is set for passing the optical signals through.

* * * * *